(12) United States Patent
Weldy

(10) Patent No.: US 7,334,830 B2
(45) Date of Patent: Feb. 26, 2008

(54) TONNEAU COVER

(76) Inventor: Ross Weldy, 57226 Nagy Dr., Elkhart, IN (US) 46517

( * ) Notice: Subject to any disclaimer, the term of this patent is extended or adjusted under 35 U.S.C. 154(b) by 979 days.

(21) Appl. No.: 10/286,711

(22) Filed: Nov. 4, 2002

(65) Prior Publication Data

US 2007/0108792 A1    May 17, 2007

(51) Int. Cl.
*B60P 7/02* (2006.01)
(52) U.S. Cl. .................. 296/100.09; 296/100.16; 296/100.18; 296/100.07
(58) Field of Classification Search .......... 296/100.11, 296/100.16, 100.18, 100.09, 100.06, 100.07
See application file for complete search history.

(56) References Cited

U.S. PATENT DOCUMENTS

| 4,607,876 A | * | 8/1986 | Reed | 296/100.18 |
| 4,861,092 A | | 8/1989 | Bogard | |
| 4,968,085 A | * | 11/1990 | Stann | 296/100.16 |
| 5,595,417 A | | 1/1997 | Thoman | |

* cited by examiner

*Primary Examiner*—Joseph D. Pape
(74) *Attorney, Agent, or Firm*—Botkin & Hall, LLP

(57) ABSTRACT

A soft top tonneau cover is formed from a plurality of hinged frame sections that are foldable between overlaying positions and extended positions. Camlock clamps are integrated into the frame so as to provide a stable, quick release latch to the walls of the bed with a minimum of spacial intrusion into the bed. The hinge between the frame sections has a double pivot so as to automatically tension the top when folded open. Strap clamps are integrated into the frame so as to permit the sections to be secured when folded closed.

13 Claims, 7 Drawing Sheets

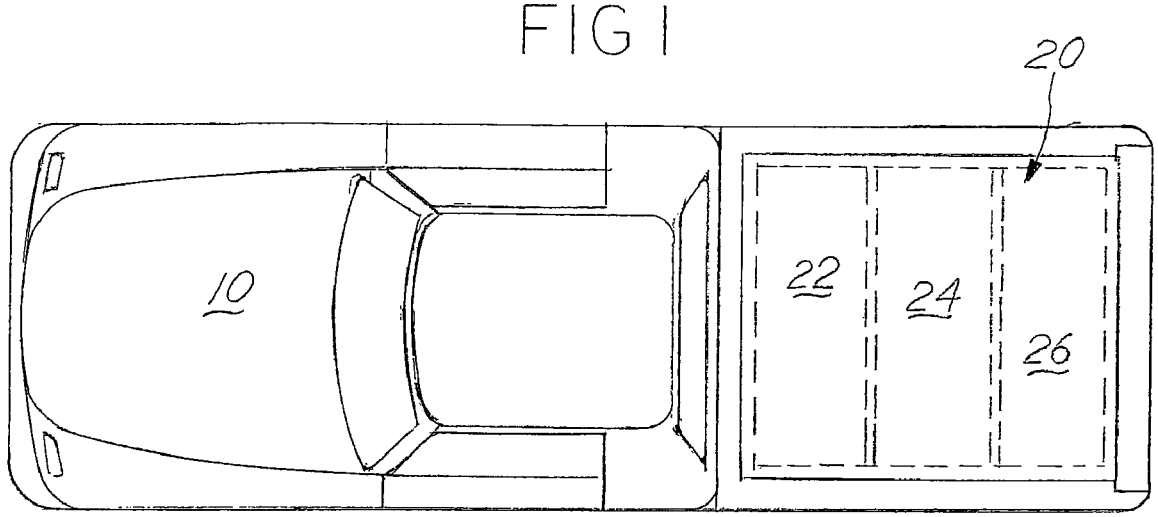
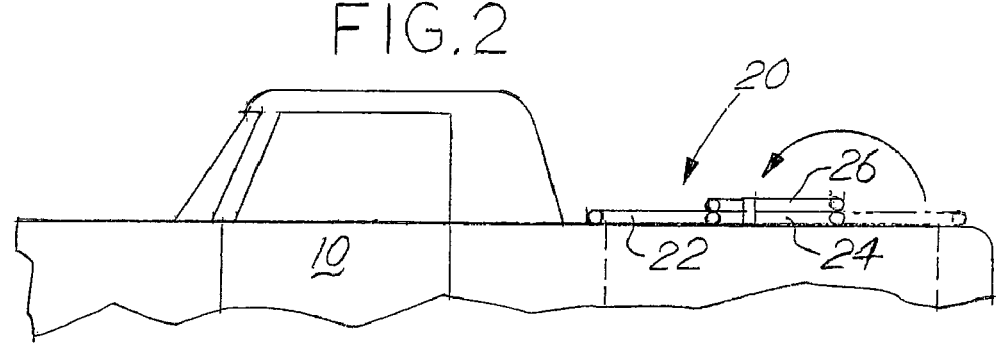
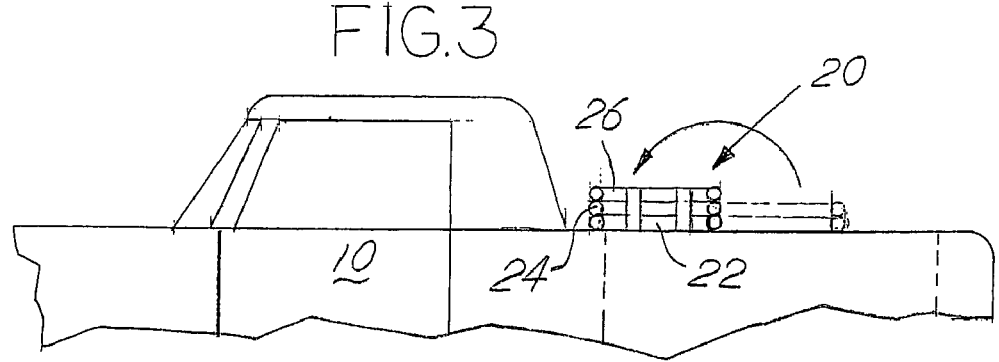

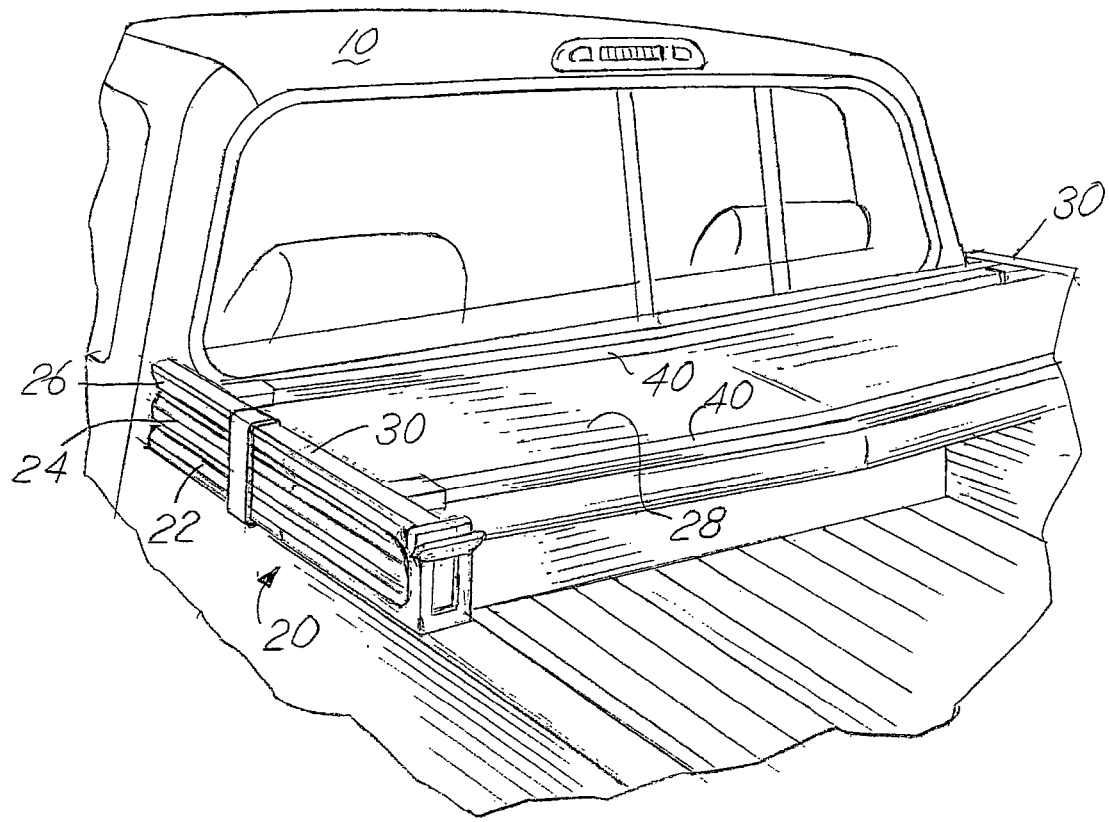
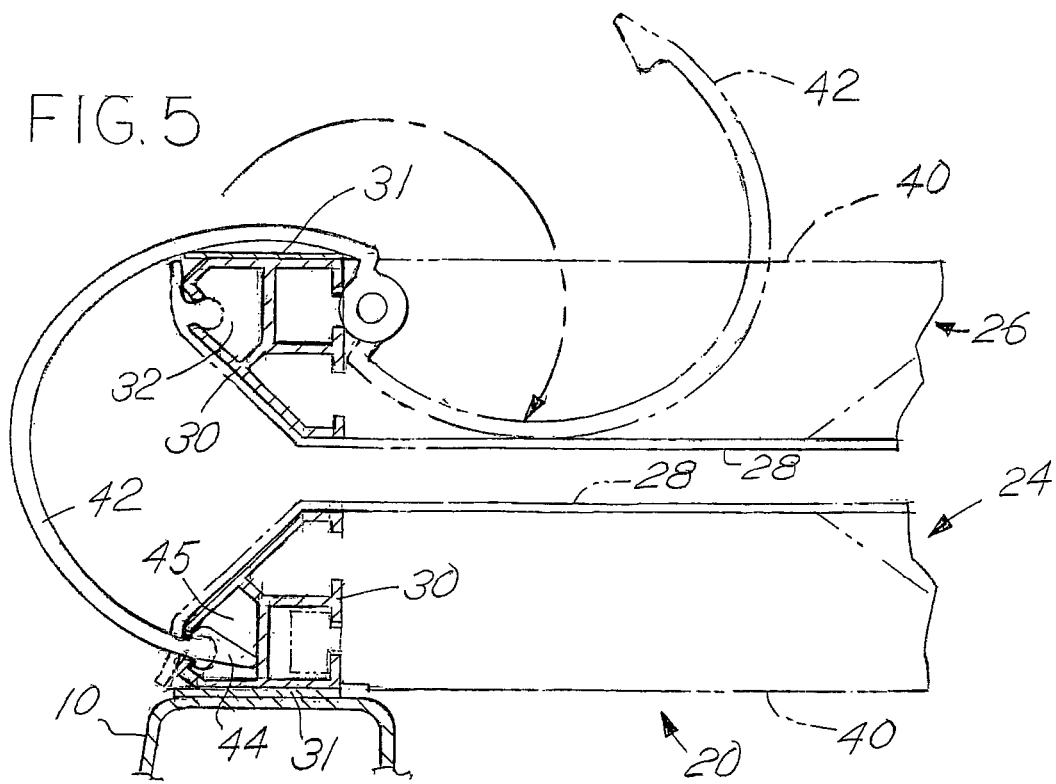

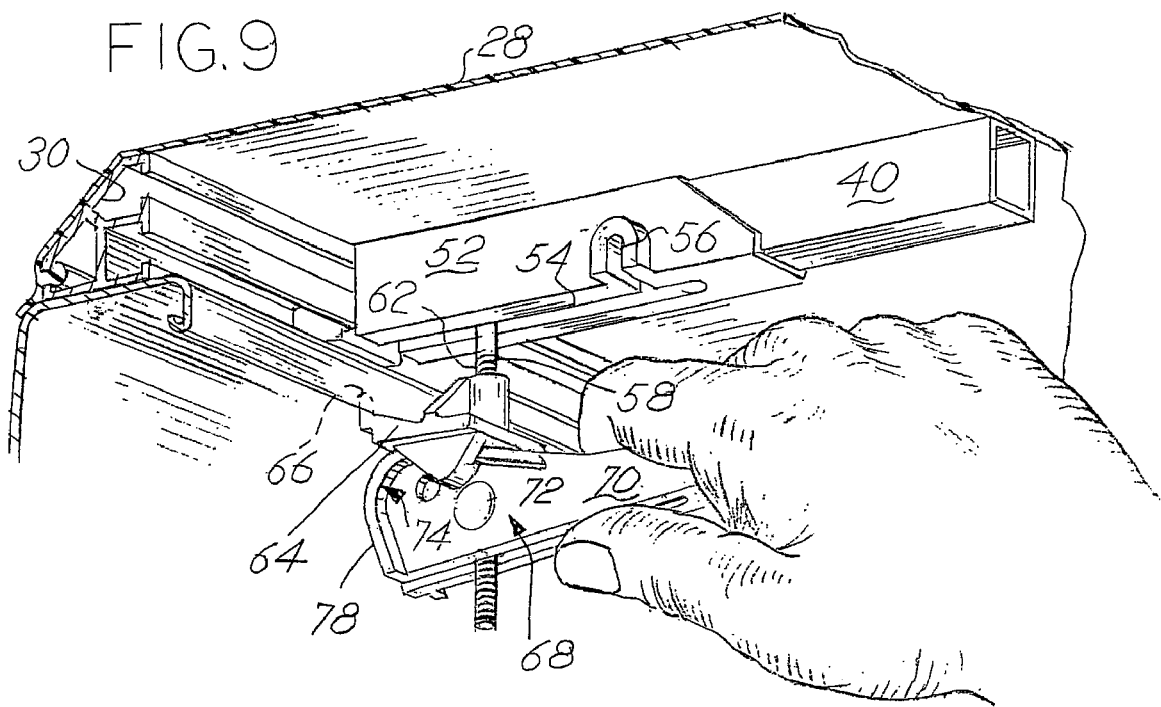
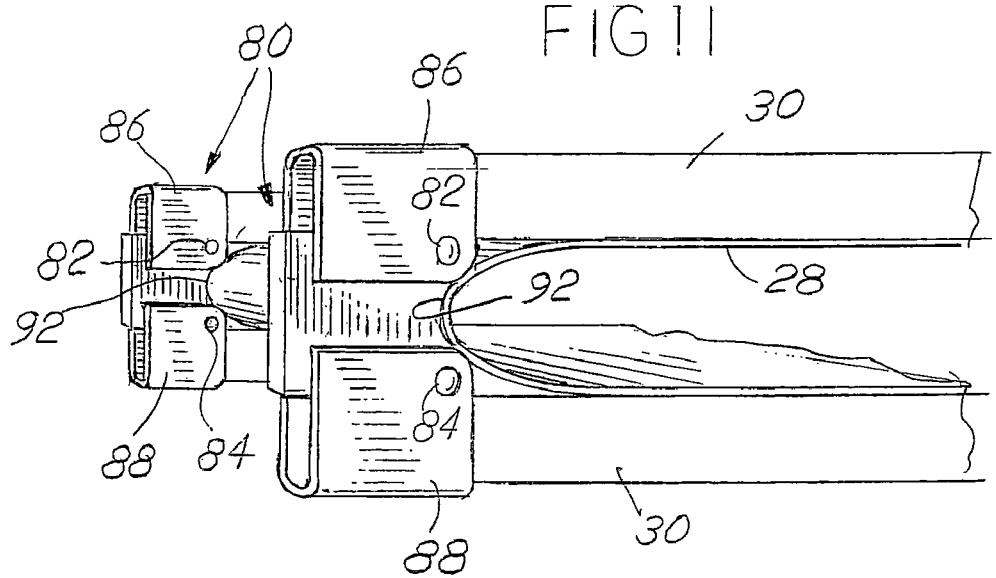

TONNEAU COVER

BACKGROUND AND SUMMARY OF THE INVENTION

The present invention relates to covers for the cargo bed of a pick up truck, and, more particularly, to flexible tonneau covers that are removable from the cargo bed of the pick up truck.

A wide variety of covers for the cargo bed of a pick up truck are presently known. In general, such covers are known as either "caps" or "tonneau covers," the caps typically being an enclosure that extends substantially above the bed so as to increase the height of the cargo bed and the tonneau covers typically being a covering the lies substantially flush with the top walls of the cargo bed without significantly increasing the height of the cargo bed. Tonneau covers are generally of two types, hard top and soft top, meaning that the material covering the bed is either rigid, as with metal, fiberglass or the like, or that the material is flexible, as with canvas, vinyl, or a weather resistant fabric.

Tonneau covers provide protection for cargo carried in the bed of the pick up truck from adverse weather, such as rain, snow, wind, etc., and also from theft, vandalism, etc. Tonneau covers can also improve fuel efficiency of the pick up truck by reducing the drag on the vehicle caused by the configuration of the cargo bed. Tonneau covers can also improve the aesthetic appearance of the pick up truck by providing a more streamlined automotive appearance.

Most tonneau covers are releasably clamped to the bed of the pick up truck since it can be necessary on occasion to carry loads in the bed that exceed the height limitations of the tonneau cover. Hard top tonneau covers, while in general providing greater security for cargo and typically being preassembled, can be more easily clamped onto the bed of the pick up truck, but have substantially more weight and bulkiness than soft top tonneau covers. Thus, it typically requires two or more people to install or remove a hard top tonneau cover. Further, since most hard top tonneau covers maintain their full size and shape once removed, significant storage space is needed for the cover during the time it is removed from the pick up truck. Also, the clamps, mounting frame, hinges and hardware of many hard top tonneau covers are completely separable from the cover and must be kept track of when the cover is in storage.

Soft top tonneau covers, on the other hand, are generally lighter in weight, can be stored more compactly during non-use and may be installed and removed by a single person onto and off of the pick up truck. However, because they are typically not preassembled, much greater time is needed: often the frame has to be mounted to the bed of the pick up truck piece by piece and then the fabric covering stretched in place and secured to the frame. Also, soft top tonneau covers often to not allow as convenient access to the bed of the pick up truck once installed since they do not include hinged and spacious openings, as found on many hard top tonneau covers. For example, where a soft cover is unfastened at a corner to give access to the truck bed, one or more of the frame bows or the back rail may still extend across the bed and limit access to the bed. Similarly, many soft top tonneau covers cannot provide the same level of security as hard top tonneau covers since reliable lock and latch mechanisms are not available with the fabric cover structure.

Both types of tonneau covers need to include clamp systems that securely retain the cover to the truck at all vehicle speeds and over sustained periods of vibration and environmental exposure. Previously, various separate C-clamps and permanent rail structures have been used. In general, these have had the disadvantages of being relatively slow to position and properly install, overly intrusive of the cargo bed space (interfering with cargo movement or damaging cargo during loading and unloading, for example), relatively expensive to manufacture, and/or causing penetration of the cargo bed walls. Further, given the diversity of cargo bed construction and wall configurations, it is sometimes necessary to have specific clamps for specific models of pick up trucks. Moreover, some of the prior C-clamps used for tonneau covers have been prone to unstable installation due to mismatched surface configurations between the clamp and the portions of the bed walls to which they were applied.

Also, such C-clamps are typically mounted under the tonneau covers. Thus, with tonneau covers where the top and some or all of the frame can be removed as a single unit, the low clearance height of the cover over the bed can make access to the clamps inconvenient when the clamps are to be applied or released. On the other hand, with tonneau covers where it is necessary to separate the top from the frame in order to remover the tonneau cover from the vehicle, the clamps are more easily accessible once the top is removed, but then the top often has to be stretched or tensioned over the frame and/or additionally aligned and secured in place.

Accordingly, it is an object of the present invention to provide and improved tonneau cover for the bed of pick up trucks. Other objects include the provision of a tonneau cover that:

a. can be pre-assembled prior to installation and readily mounted to the vehicle as a complete unit, b. is readily attachable to a variety of different model pick up trucks with a common latching mechanism, c. is compact in dimension and lightweight when positioned for storage and/or shipment, d. provides a lockable enclosure for the bed of a pick up truck, e. includes a secure, quick release clamping system that is not prone to misalignment during use and misplacement during storage and/or shipping, f. is inexpensive to manufacture and easily installed by a single person, g. provides amble and easy access to the bed of the pick up truck when needed, h. maintains its cover configuration over an extended period of time, and i. minimizes intrusion into the cargo area.

These and other objects of the present invention are attained by the provision of a soft top tonneau cover formed from a plurality of hinged frame sections that are foldable between overlaying positions and extended positions. Cam-lock clamps are integrated into the frame so as to provide a stable, quick release latch to the walls of the bed with a minimum of spacial intrusion into the bed. The hinge between the frame sections has a double pivot so as to automatically tension the top when folded open. Strap clamps are integrated into the frame so as to permit the sections to be secured when folded closed.

Other objects, advantages and novel features of the present invention will become readily apparent from the following drawings and detailed description of preferred embodiments.

BRIEF DESCRIPTION OF THE DRAWINGS

FIG. 1 shows a top view of an exemplary installation of the present invention on a pick up truck in the fully extended position.

FIG. 2 shows a partial side view of the installation of FIG. 1 with one section of the tonneau cover folded closed to overlay another section of the tonneau cover.

FIG. 3 shows a partial side view of the installation of FIG. 1 with two sections of the tonneau cover folded closed to overlay a third section of the tonneau cover.

FIG. 4 shows an enlarged, rear left side, top perspective view of a portion of the pick up truck with the tonneau cover in the position of FIG. 3.

FIG. 5 shows a further enlarged cross-sectional view of the side of one section when folded onto another section, as in FIG. 2.

FIG. 9 shows an enlarged, partial underside view of the cam lock clamp of the present invention as positioned onto the bed wall during installation or removal of the tonneau cover.

FIG. 11 shows an enlarged, partial side perspective view of one section of a tonneau cover of the present invention folded onto another section at the location of the hinge.

DESCRIPTION OF PREFERRED EMBODIMENTS

Figure 6:
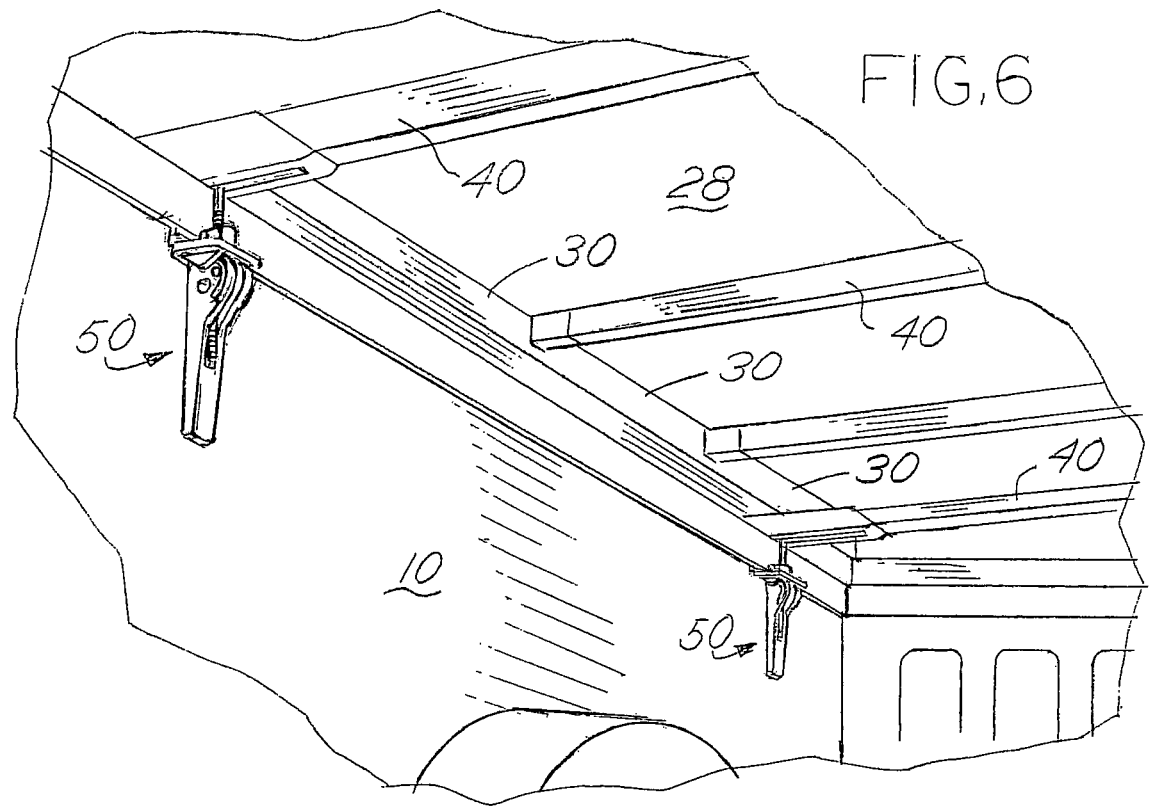
FIG. 6 shows an rearward, underside partial view of the right interior side of the bed of a pick up truck with the tonneau cover in the position of FIG. 1.

The drawings show various aspects of preferred embodiments of the present invention from different perspectives and in different scales of enlargement, as needed for ease of viewing. In preferred embodiments, the present invention is formed as a soft top tonneau cover 20 mounted onto the cargo bed of an exemplary pick up truck 10. Cover 20 is formed from multiple sections that are foldable to overlay one another or opened to extend over the cargo bed. Cover 20 is shown with sections 22, 24 and 26 as an example. In other embodiments two, four or more sections can be used as desired for a given application. In many embodiments, each section will have approximately the same dimensions. It is expected, however that some dimensional differences can be employed in given embodiments, as, for example, to facilitate alignment of the section sides and/or edges when fully folded.

Using the example of a three section embodiment, FIG. 1 shows sections 22, 24 and 26 fully opened and extended to cover the entire cargo bed. FIG. 2 shows section 26 folded to overlay section 24 such that approximately two thirds of the cargo bed is covered by tonneau cover 20. FIG. 3 shows section 24 folded to overlay section 22, with section 26 still folded over section 24, such that approximately one third of the cargo bed is covered by tonneau cover 20.

In general, tonneau cover 20 is formed from a rigid frame of side rails and support rails or bows covered by a sheet 28 of flexible material. The frame members are, for example, formed from extruded aluminum or a like structural material, and sheet 28 is, for example, formed from weather proof vinyl or a similar plastic material. A variety of such materials have been used in tonneau covers and may be readily selected according to the desired durability, availability and cost of manufacture. Each section of tonneau cover 20 is preassembled to include a left and right side rail 30 and at least one support rail 40 spanning between the left and right side rails. Preferably, two or three support rails 40 so span the side rails and are rigidly connected to the side rails. Side rails 30 include, for example, a groove 32 for receiving an edge or bead on sheet 28 in a conventional manner to secure sheet 28 to the side rails. At the front and rear of tonneau cover 20 (the unhinged end edges of sections 22 and 26), the support rails, serving as front or back rails are formed with a similar groove for the same purpose. Other conventional means of attaching the cover sheet to the frame can also be employed as desired in particular applications. Insulating tape 31 can be advantageously applied to the portion of the side rails engaging the walls of the cargo bed so as to minimize abrasion and vibration effects.

The result of this construction is that each section is self supporting as a unit. The sections are then hinged together at the respective side rails and joined by the common cover sheet 28. This hinging allows the sections to be folded onto each other to reduce the effective dimensions of the tonneau cover for storage and shipping and to provide access to the cargo bed. Also, since the cover sheet need never be removed from the frame, greater security and weather protection is permitted for the cargo bed. A conventional lock mechanism can be attached to the tonneau cover at, for example the back rail of section 26, to restrain that section from folding back to overlay section 24, by either engagement with the tail gate or side walls of the cargo bed or by blocking the hinge movement between sections.

When the sections are folded to overlay one another, they can be secured in that position for travel. For example, as shown in FIGS. 4 and 5, strap clamps 42 are attached to side rails 30 of sections 24 and 26 (only one of which is shown in use in each of the figures). When the sections are folded to overlay one another, strap clamps 42 are then wrapped over both of the now adjacent side rails and secured in place. Strap clamps 42 are, for example, formed with an enlarged end 44 for that purpose which is removably connected to a groove or slot 45 in the side rails. Thus, oversized cargo can be hauled by the pick up truck without totally removing the tonneau cover. Further, the tonneau cover can be secured in a compact position for movement on and off the cargo bed.

Figure 12:
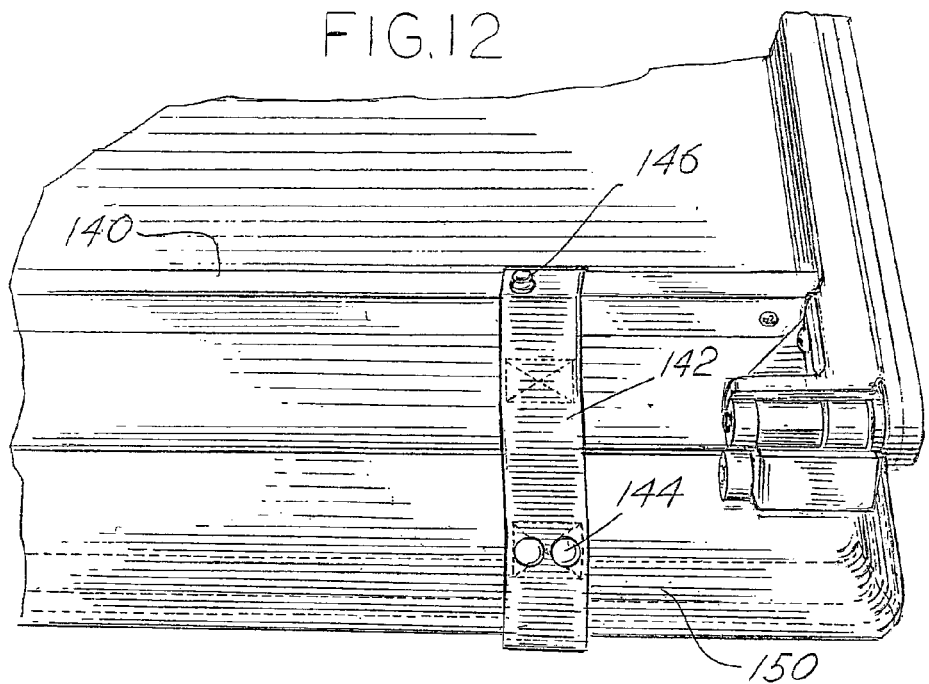
FIG. 12 shows a front, right top perspective view of a tonneau cover according to the present position with the sections overlaid and using an alternative means of securing the sections in place.

Various alternative devices can be used to hold the sections in place when folded to overlay one another. For example, as shown in FIG. 12, instead of strap clamps 42 attached at the sides of the sections, one or more straps 142 can be mounted to a support rail 140 which is forwardmost and exposed when the sections are so overlaid. Each strap 142 can include conventional snap fittings 144 that matingly receive conventional projections mounted on the surface of the front edge 150 of the tonneau cover. To secure strap 142 from loose movement when not in use, a conventional projection 146 can also be mounted on the portion of strap 142 to matingly receive at least one of snap fittings 144 when the sections are not overlaid.

Figure 7:
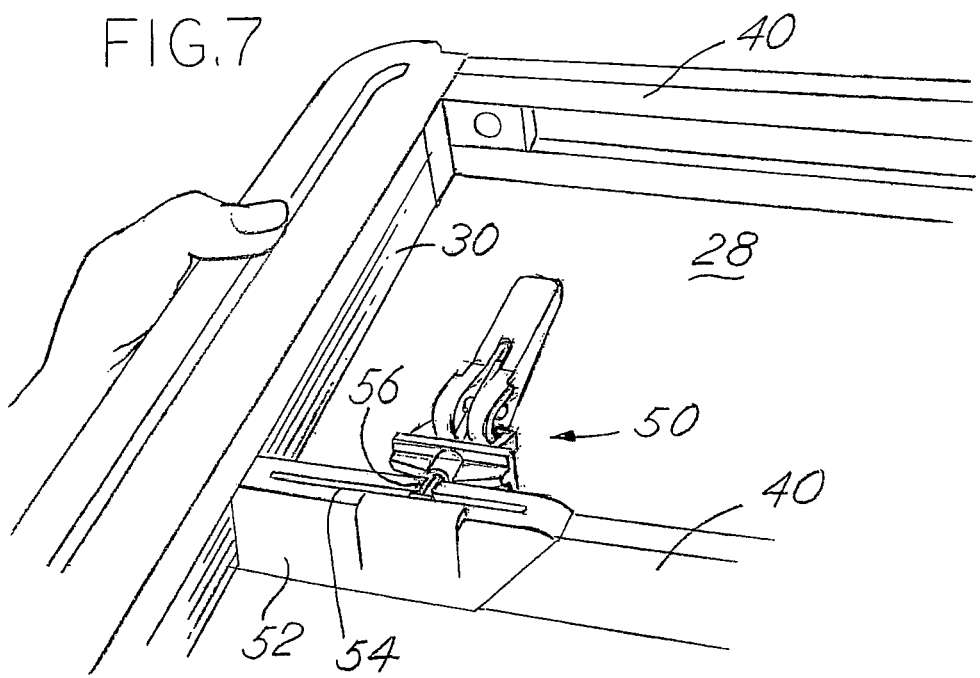
FIG. 7 shows an enlarged underside view of a corner portion of a tonneau cover of the present invention with the cam lock clamp folded for storage.

To retain tonneau cover 20 to the cargo bed, a plurality of quick release, cam lock clamps 50 is provided in especially preferred embodiments of this invention. As shown in FIG. 6, when these clamps are locked onto the walls of the cargo bed, they fold flush against the walls of the cargo bed with minimal protrusion into the area of the cargo bed. At the same time, as shown in FIG. 7, when the section on the tonneau cover to which the clamp is associated is folded or removed from the cargo bed, clamps 50 are then folded to lie flush with cover sheet 28.

Figure 8:
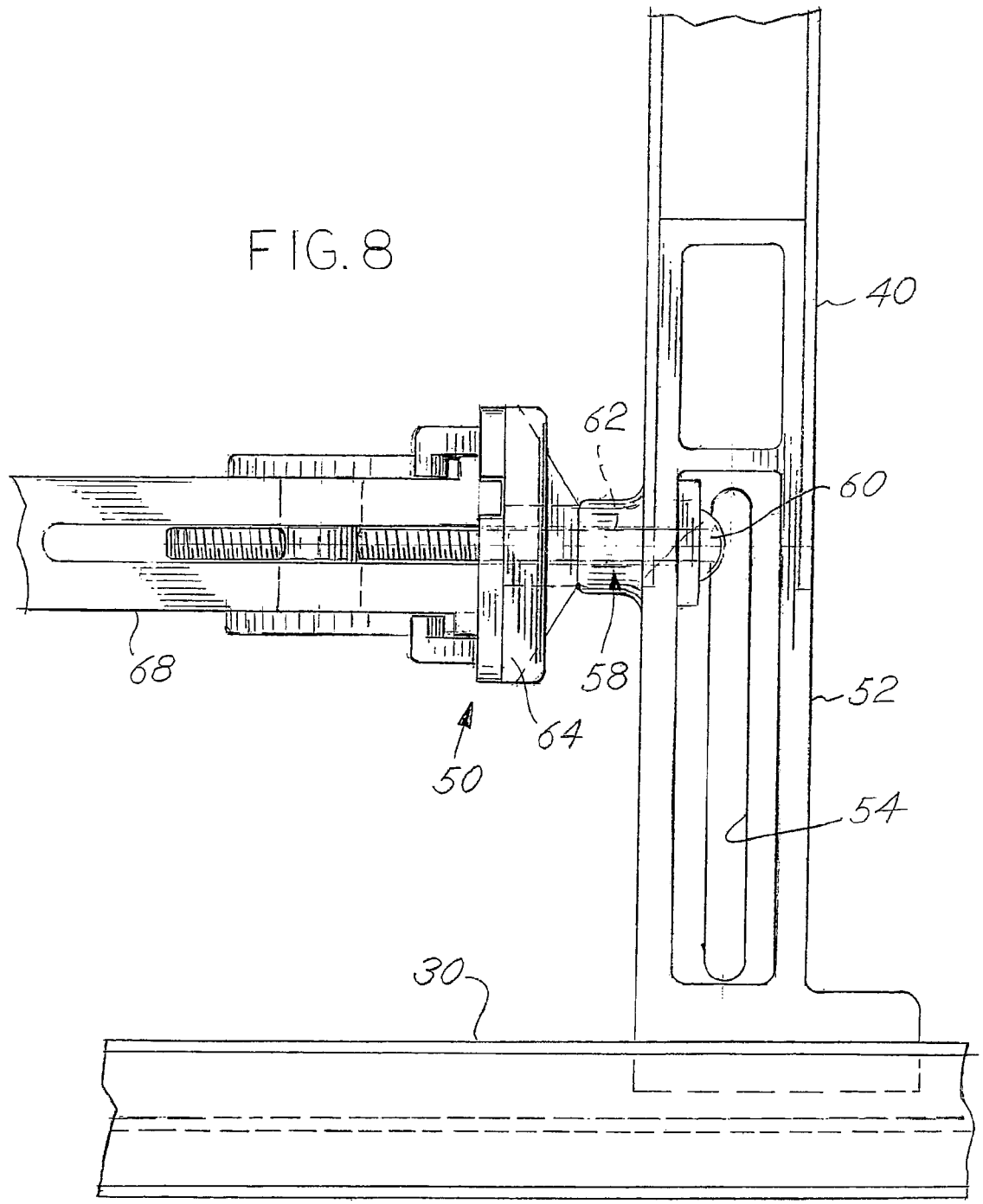
FIG. 8 shows a further enlarged, partial top schematic view of the cam lock clamp in the folded position of FIG. 7.
Figure 10:
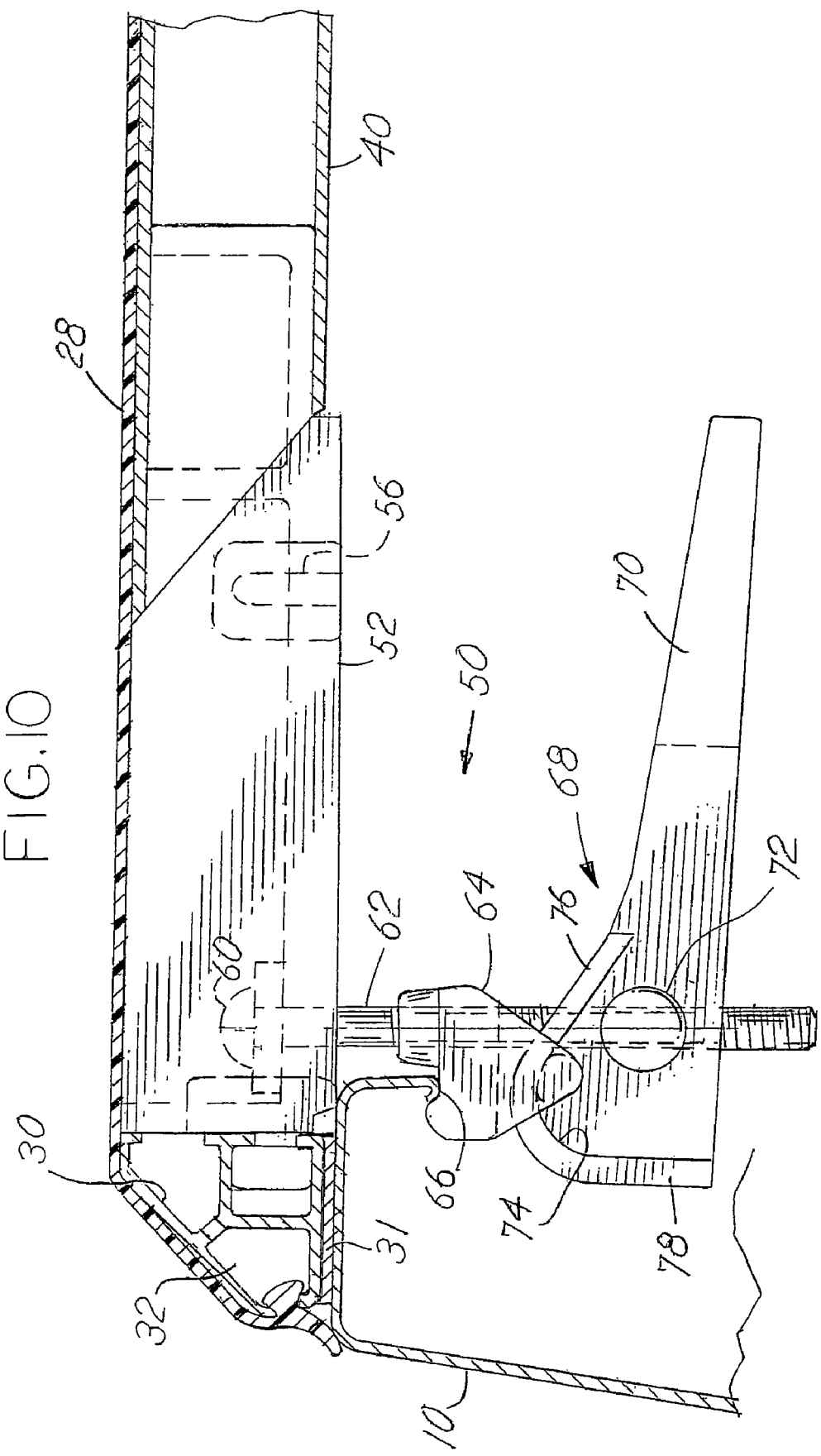
FIG. 10 shows a further enlarged, partial side schematic view of the cam lock clamp in the installation/removal position of FIG. 9.

Preferably, clamps 50 are integrated into some of the support rails and are slidable within grooves or slots of a track of the support rail between the locked and storage positions desired at a given time. As shown in FIGS. 8 and 10, a support rail 40 can be formed with a clamp base 52 at its ends, slide into an opening of the support rail. Clamp base 52 is formed, for example, with intersecting horizontal slot 54 and vertical slot 56. Each clamp 50 includes an arm member 58 mounted into and movable with respect to these slots. For example, arm member 58 can be a threaded bolt whose head 60 is retained within the slots and whose shank 62 extends out of the slots. In the locked position, shank 62 extends out of horizontal slot 54 such that it extends downwardly, and in the storage position, shank 62 extends out of vertical slot 56 such that it extends roughly parallel and adjacent to cover sheet 28.

Clamps 50 also include a truck grip member 64 that is, for example, slidably mounted onto arm member 58. Truck grip member 64 includes a recess or lip 66 to matingly receive or abut a portion of the wall of the cargo bed. Clamps 50 also include a cam lock member 68 mounted onto arm member 58. Preferably, cam lock member 68 is threaded onto shank 62 and positioned adjacent to truck grip member 64. Cam-lock member 68 includes a handle portion 70 which is pivotably connected to a cam base 72. Handle portion 70 includes a cam surface 74 for engaging and applying clamping force to truck grip member 64. In the example shown, cam surface 74 is formed with a ramped portion 76 and a flat portion 78. In use, handle portion 70 is, for example, in a horizontal position when the truck grip member is initially positioned to receiving the wall and then moved to downwardly to a vertical position as the truck grip member is then urged to clamp tighter against the wall. Handle portion 70 is left in a vertical position when truck grip member is fully locked in place. By integrating clamps 50 into the support rails in this manner, the clamps are automatically properly positioned with respect to the walls of the cargo bed and stabilized for ease and security of clamping connection.

Figure 13:
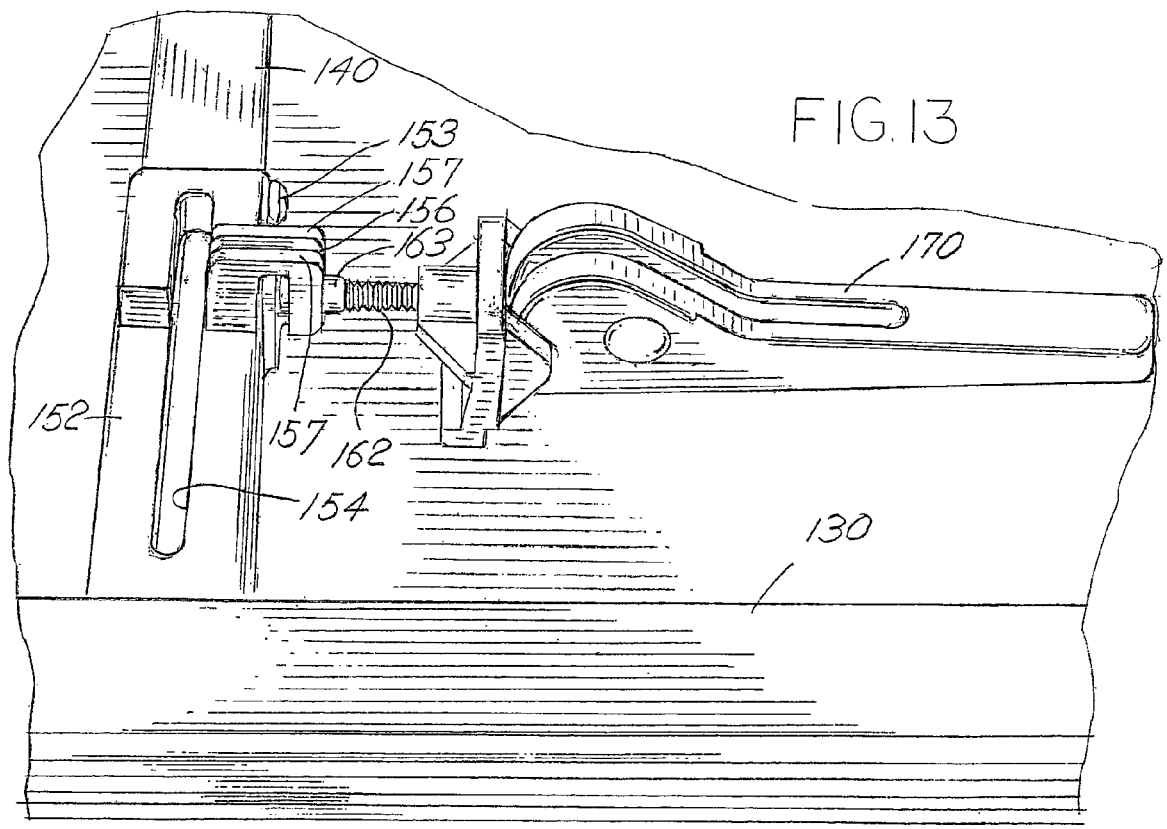
FIG. 13 shows an enlarged, perspective partial view of the underside of a tonneau cover employing an alternative embodiment of the present invention.

Various alternative constructions of clamps 50 can also be used with the present invention. For example, as shown in FIG. 13, clamp base 152 can be joined to support rail 140 via a set screw 153. Thus, in those applications where the cargo bed of the pick up truck has curved walls, a common length support rail can be used with the clamp base adjusting the effective length of the support rail according to the position of set screw clamping. This adjustment can be made at the factory according to the particular model of pick up truck so that the tonneau cover is provided to the user fully prepared for installation. Similar set screws can be used at all the joints between support rails 140 and side rails 130, regardless of whether that joint uses a base clamp 152.

Also, in order to hold handle portion 70 flush against the underside of the tonneau cover when clamp 50 is not in use, various means can be used. For example, the clearance between slot 56 and shank 62 can be restricted, with the material forming slot 56 being slightly resilient and the lateral distance across slot 56 being dimensionally smaller than the diameter of shank 62 such that an interference fit results when shank 62 is placed with slot 56. Alternatively, as shown in FIG. 13, a sleeve 163 can be placed about the upper portion of shank 162 and clamping bosses or ledges 157 formed at the entrance to slot 156. The material of sleeve 163 and ledges 157 are, for example, relatively resilient and ledges 157 serve to narrow the lateral area across slot 156 so as to somewhat resist, but not completely prevent, passageway between slot 156 and slot 154. Thus, once the user (or shipper) places handle 170 into the non use position, shank 162 is retained in slot 156 until the user affirmatively moves shank 162 out of that slot, ledges 163 being formed to prevent movement of shank 162 out of slot 156 without application of additional motive force by the user.

The hinge arrangement between the sections of tonneau cover 20 can be used to automatically stretch and tighten cover sheet 28 when the sections are unfolded and extended over the cargo bed. For example, as shown in FIG. 11, the side rails of each section are joined by hinge member 80, having two pivot pins 82 and 84 mounted in brackets 86 and 88, respectively. Spacer 90 is mounted between brackets 86 and 88 and held in place by the pivot pins. Thus, when the sections are folded to overlay one another, cover sheet 28 folds with a curved portion 92, rather than a sharp crease. When the sections unfold, that curve is stretched flat to provide the tension to tighten cover sheet 28.

Although the present invention has been described in detail above with regard to specific embodiments, the same has been for illustration and example only. Not all of the features of preferred embodiments need to be employed in every embodiment. For example, the folding sections of the present invention can also be employed with conventional C-clamps if desired. Also, while a flexible cover sheet is often preferred for weight and cost savings, a rigid cover sheet can be employed in certain embodiments if greater cover strength, for example, is desired. Accordingly, the spirit and scope of the present invention is limited only by the terms of the following claims.

What is claimed is:

1. A cover for the bed of a pick up truck, comprising:
   a first section and a second section,
   a covering overlaying the first and second sections, and
   the second section being joined to the first section so as to be moveable between an extended position adjacent to the first section and a folded position overlaying at least part of the first section,
   wherein the second section is hinged to the first section, the second section is releasably clamped to the pick up truck when in the extended position, and the second section is releasably clamped to the first section when in the folded position,
   and a third section hinged to the second section, the third section is releasably clamped to the pick up truck when in the extended position, the third section is releasably clamped to the second section when in its folded position, and the second and third sections are releasably clamped to the first section when in their folded positions.

2. The cover according to claim 1 wherein the first and second sections are each formed from a frame having at least two opposing side rails connected by at least one support rail.

3. The cover according to claim 2 wherein the respective side rails of each frame are hinged together, the covering is formed from a flexible material, and the covering material being selected so as to be self tightening when the second section is in the extended position.

4. The cover according to claim 2 wherein the first and second sections are removeably attached to the pick up truck when the second section is in its folded position, and the second section remains in the folded position with respect to the first section once so removed.

5. The cover according to claim 2 wherein at least one clamp is mounted to the frame of the first section which releasably secures that section to the pick up truck.

6. The cover according to claim 5 wherein the clamp includes a base portion fixed with respect to the frame, an arm connected to the base, a truck grip member movably mounted on the arm, and a cam lock adjustably mounted on the arm and movably engaging the truck grip member.

7. The cover according to claim 6 wherein the base portion is integrated into the support rail and includes a slotted track for receiving the arm, the arm is formed as a threaded post mounted within the slotted tract and movable along that track, the truck grip member includes a portion for engaging a surface of the pick up truck.

8. The cover according to claim 7 wherein the frame of the second section and the truck grip member are positionable to be able to receive a portion of the pick up truck therebetween and releasably clamp onto that portion of the pick up truck.

9. The cover according to claim 7 wherein the slotted track extends in at least two directions, allowing the arm to move between horizontal and vertical orientations.

10. The cover according to claim 5 wherein a hinge clamp is mounted to the frame of the second section which is able to releasably engage the frame of the first section when the second section is in the folded position.

11. The cover according to claim 10 wherein the hinge clamp is mounted to at least one of the side rails of the second section and is able to releasably engage the respective side rail of the first section.

12. A tonneau cover for the bed of a pick up truck, comprising:

first, second and third sections, each section including a frame having left and right side rails joined by a pair of support rails, a flexible, weather-resistant covering overlaying and connected to each of the sections, the left side rails of the second and third sections being hinged together and the right side rails of the second and third sections being hinged together so as to allow the third section to fold onto the second section, the left side rails of the second and first sections being hinged together and the right side rails of the second and first sections being hinged together so as to allow the second section to fold onto the first section when the third section was already folded onto the second section, at least one clamp is mounted to the frame of the first section which releasably secures that section to the pick up truck, the at least one clamp includes a base portion fixed with respect to the frame of the first section, an arm connected to the base, a truck grip member movably mounted on the arm, and a cam lock adjustably mounted on the arm and movably engaging the truck grip member, and the base portion is integrated into one of said support rails and includes a slotted track for receiving the arm, the arm is formed as a threaded post mounted within the slotted track and movable along the track, the truck grip member includes a portion for engaging a surface of the pick up truck.

13. The tonneau cover according to claim 12 wherein side rails of the second and first sections are hinged together using an articulated hinge having two spaced apart pivot points.

* * * * *

UNITED STATES PATENT AND TRADEMARK OFFICE
CERTIFICATE OF CORRECTION

PATENT NO.         : 7,334,830 B2                                     Page 1 of 1
APPLICATION NO. : 10/286711
DATED              : February 26, 2008
INVENTOR(S)        : Ross Weldy It is certified that error appears in the above-identified patent and that said Letters Patent is hereby corrected as shown below:

Claim 12 should read: --A tonneau cover for the bed of a pick up truck, comprising:

first, second and third sections, each section including a frame having left and right side rails joined by a pair of support rails, a flexible, weather-resistant covering overlaying and connected to each of the sections, the left side rails of the second and third sections being hinged together and the right side rails of the second and third sections being hinged together so as to allow the third section to fold onto the second section, the left side rails of the second and first sections being hinged together and the right side rails of the second and first sections being hinged together so as to allow the second section to fold onto the first section when the third section was already folded onto the second section, at least one clamp mounted to the frame of the first section which releasably secures that section to the pick up truck, said clamp including a base portion fixed with respect to the frame, an arm connected to the base, a truck grip member movably mounted on the arm, said base portion being integrated into the support rail and including a slotted track for receiving the arm, the arm is formed as a threaded post mounted within the slotted track and movable along that track, the truck grip member includes a portion for engaging a surface of the pick up truck.--

Signed and Sealed this

Seventeenth Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,334,830 B2
APPLICATION NO. : 10/286711
DATED : February 26, 2008
INVENTOR(S) : Ross Weldy Page 1 of 1

It is certified that error appears in the above-identified patent and that said Letters Patent is hereby corrected as shown below:

Column 8, lines 1-30
Claim 12 should read: --A tonneau cover for the bed of a pick up truck, comprising:

first, second and third sections, each section including a frame having left and right side rails joined by a pair of support rails, a flexible, weather-resistant covering overlaying and connected to each of the sections, the left side rails of the second and third sections being hinged together and the right side rails of the second and third sections being hinged together so as to allow the third section to fold onto the second section, the left side rails of the second and first sections being hinged together and the right side rails of the second and first sections being hinged together so as to allow the second section to fold onto the first section when the third section was already folded onto the second section, at least one clamp mounted to the frame of the first section which releasably secures that section to the pick up truck, said clamp including a base portion fixed with respect to the frame, an arm connected to the base, a truck grip member movably mounted on the arm, said base portion being integrated into the support rail and including a slotted track for receiving the arm, the arm is formed as a threaded post mounted within the slotted track and movable along that track, the truck grip member includes a portion for engaging a surface of the pick up truck.--

This certificate supersedes the Certificate of Correction issued June 17, 2008.

Signed and Sealed this

Twenty-second Day of July, 2008

JON W. DUDAS
*Director of the United States Patent and Trademark Office*